United States Patent
Yoshinaga et al.

(10) Patent No.: US 12,139,346 B2
(45) Date of Patent: Nov. 12, 2024

(54) ARTICLE TRANSPORT FACILITY

(71) Applicant: Daifuku Co., Ltd., Osaka (JP)

(72) Inventors: Kazuharu Yoshinaga, Hinocho (JP); Takashi Akiyama, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 151 days.

(21) Appl. No.: 17/944,507

(22) Filed: Sep. 14, 2022

(65) Prior Publication Data
US 2023/0079654 A1 Mar. 16, 2023

(30) Foreign Application Priority Data
Sep. 15, 2021 (JP) .................................. 2021-150238

(51) Int. Cl.
*B65G 47/46* (2006.01)
(52) U.S. Cl.
CPC .................................... *B65G 47/46* (2013.01)
(58) Field of Classification Search
CPC .................................................... B65G 47/46
See application file for complete search history.

(56) References Cited

U.S. PATENT DOCUMENTS

| | | | |
|---|---|---|---|
| 9,186,706 B2* | 11/2015 | Van Haaster | .......... B65G 47/38 |
| 10,906,750 B2* | 2/2021 | Mori | .................... B65G 1/0492 |
| 2019/0389672 A1 | 12/2019 | Zhang et al. | |

FOREIGN PATENT DOCUMENTS

| | | | | |
|---|---|---|---|---|
| JP | 2019531887 A | 11/2019 | | |
| JP | 202083510 A | 6/2020 | | |
| KR | 3991859 B1 * | 6/2020 | ............. | B65G 47/48 |

OTHER PUBLICATIONS

DE102022001774 (Year: 2022).*
EP3713857 (Year: 2018).*

* cited by examiner

*Primary Examiner* — Gene O Crawford
*Assistant Examiner* — Lester Rushin, III
(74) *Attorney, Agent, or Firm* — The Webb Law Firm

(57) ABSTRACT

An article transport facility of the present invention includes a transport device that is arranged below a traveling surface and transports articles below the traveling surface, door members that are provided in correspondence with openings and change in orientation between an open orientation in which the openings are open and a closed orientation in which the opening are closed, and a door control section that controls the door members. The transport device is configured to transport multiple articles synchronously and simultaneously in an article group, and the door control section opens all of the door members provided in a receiving section group synchronously and simultaneously.

6 Claims, 10 Drawing Sheets

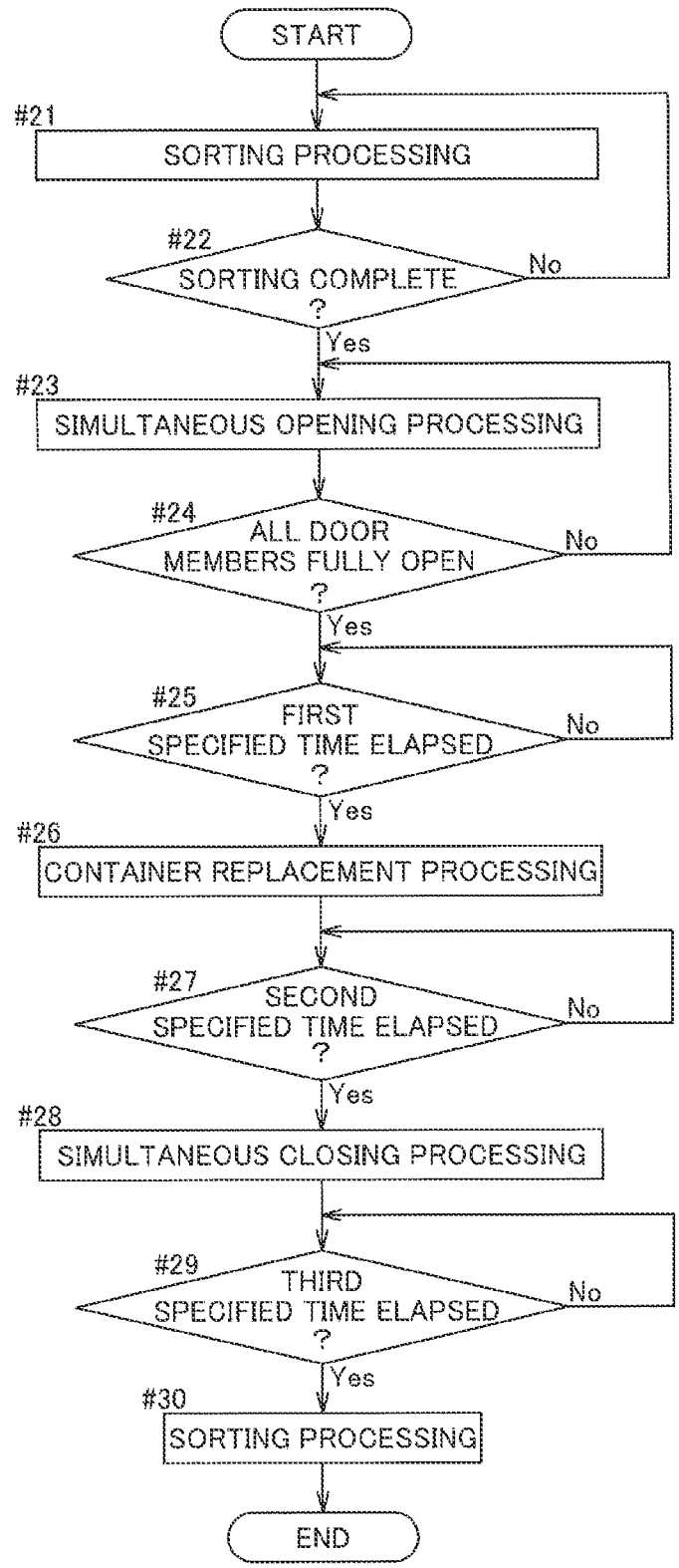

ARTICLE TRANSPORT FACILITY

CROSS REFERENCE TO RELATED APPLICATION

The application claims priority to Japanese Patent Application No. 2021-150238, filed Sep. 15, 2021, the disclosure of which is hereby incorporated by reference in its entirety.

BACKGROUND OF THE INVENTION

1. Field of the Invention

The present invention relates to an article transport facility that sorts and transports articles and includes an article transport vehicle for transporting articles, a traveling surface on which the article transport vehicle travels, and a plurality of receiving sections for receiving articles from the article transport vehicle.

2. Description of the Related Art

As one example, JP 2019-531887 (Patent Document 1) discloses an article transport facility that includes an article transport vehicle for sorting articles on a floor surface and a transport device for transporting sorted articles below the floor surface. In the following, the reference numerals shown in parentheses in the description of related art are the reference numerals used in Patent Document 1.

In the facility disclosed in Patent Document 1, an article transport vehicle (sorting robot 5) sorts articles based on specified conditions by placing articles in receiving sections (4) provided on the floor surface. An article placed in a receiving section (4) is stored in a container (1) arranged below the floor surface, and is transported together with the container (1) to a target location by the transport device (3).

In the facility disclosed in Patent Document 1, articles transported by the article transport vehicle (5) are successively placed in designated receiving sections (4) and then successively stored in containers (1) arranged below the floor surface. For this reason, the containers (1) cannot be carried away during the period in which articles are being sorted by the article transport vehicle (5). In order to carry away the containers (1), it is necessary to wait for the article transport vehicle (5) to complete the processing of sorting articles to the containers (1). However, in the case where multiple containers (1) are arranged side by side as in the facility disclosed in Patent Document 1, the transport device (3) needs to have a complicated configuration in order for each container (1) to be individually carried away when the sorting process for that container (1) is complete, and the transport efficiency is low. On the other hand, even if multiple containers (1) are carried away in a group, the sorting processing needs to be interrupted while the containers (1) are carried away, and thus the efficiency of the sorting processing is low. The same problems occur even in the case of a configuration in which articles placed in the receiving sections (4) are directly carried away by the transport device (3) instead of being placed in containers (1).

SUMMARY OF THE INVENTION

In view of the aforementioned circumstances, there is desire to realize technology in which the sorting of articles by an article transport vehicle and the transport of sorted articles by a transport device can both be performed efficiently.

The following is an aspect of technology for solving the above problems.

An article transport facility that sorts and transports articles, including:
an article transport vehicle configured to transport the articles;
a traveling surface on which the article transport vehicle is travelable; and
a plurality of receiving sections configured to receive the articles from the article transport vehicle,
wherein the receiving sections each include an opening, and are further configured to guide the articles through the openings to a position below the traveling surface,
the article transport facility further includes:
a transport device disposed below the traveling surface and configured to transport the articles below the traveling surface;
a plurality of door member provided in correspondence with the plurality of openings and configured to change in orientation between an open orientation in which the openings are open and a closed orientation in which the opening are closed; and
a door control section configured to control the door members,
the transport device is further configured to transport a plurality of the articles synchronously and simultaneously in an article group made up of a plurality of articles guided downward from a receiving section group made up of a plurality of receiving sections among the receiving sections, and
the door control section opens and closes all of the door members provided in the receiving section group synchronously and simultaneously.

According to this configuration, during the period in which all of the door members provided in a receiving section group are synchronously and simultaneously put in the closed orientation, articles received by the receiving sections that belong to the receiving section group can be stored in the receiving sections. During this period, articles are not guided through the openings to positions below the traveling surface. For this reason, articles can be transported by the transport device arranged below the traveling surface even during the execution of article sorting processing by the article transport vehicle. Accordingly, article sorting processing can be efficiently performed by the article transport vehicle. Also, according to this configuration, due to all of the door members provided in the receiving section group being synchronously and simultaneously put in the open orientation, the articles sorted to the receiving sections that make up the receiving section group can be simultaneously guided downward and transferred to the transport device. For this reason, the group of articles guided downward from the receiving section group can be simultaneously transported by the transport device. Accordingly, the articles sorted to the receiving sections do not need to be transported individually, the transport efficiency can be improved, and the configuration of the transport device can be easily simplified.

Further features and advantages of technology according to the present disclosure will be more apparent from the following description of exemplary and non-limiting embodiments given with reference to the drawings.

BRIEF DESCRIPTION OF THE DRAWINGS

FIG. 10 is a flowchart of processing steps executed in the second embodiment.

DESCRIPTION OF THE INVENTION

First Embodiment

An article transport facility is a facility for sorting and transporting articles. Hereinafter, a first embodiment of the article transport facility will be described below with reference to the drawings.

Overview of Article Transport Facility

Figure 1:
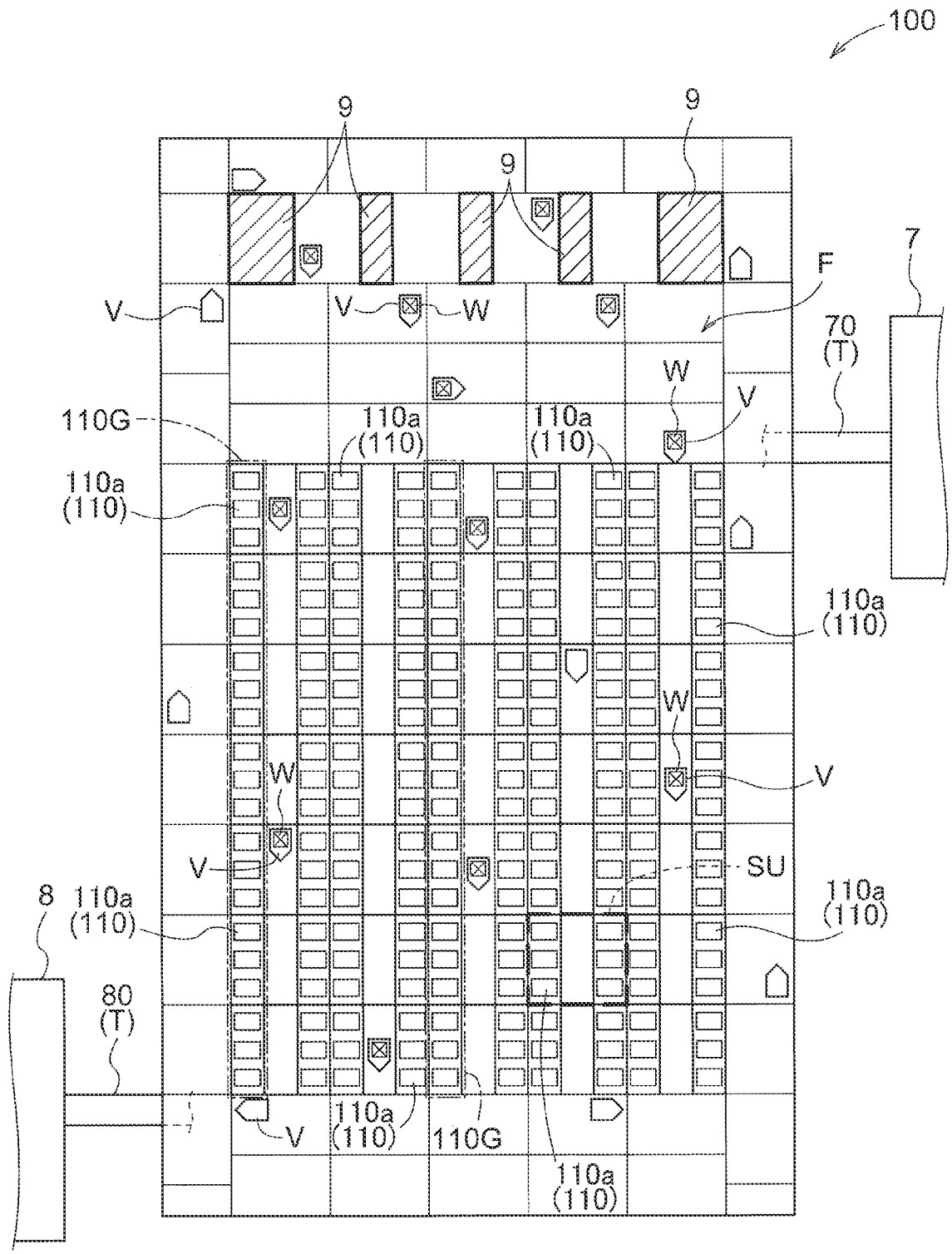
FIG. 1 is a plan view of an article transport facility.

As shown in FIG. 1, an article transport facility 100 includes article transport vehicles V for transporting an article W, a traveling surface F on which the article transport vehicles V travel, article supply sections 9 for supplying transport target articles W to the article transport vehicles V, and receiving sections 110 for receiving articles W transported by the article transport vehicles V. The traveling surface F is formed as a spreading flat surface. Passages R (see FIG. 3 and the like) along which the article transport vehicles V travel are defined on the traveling surface F. Each of the receiving sections 110 includes an opening 110a and is configured to guide an article W through the opening 110a to a position below the traveling surface F.

Figure 2:
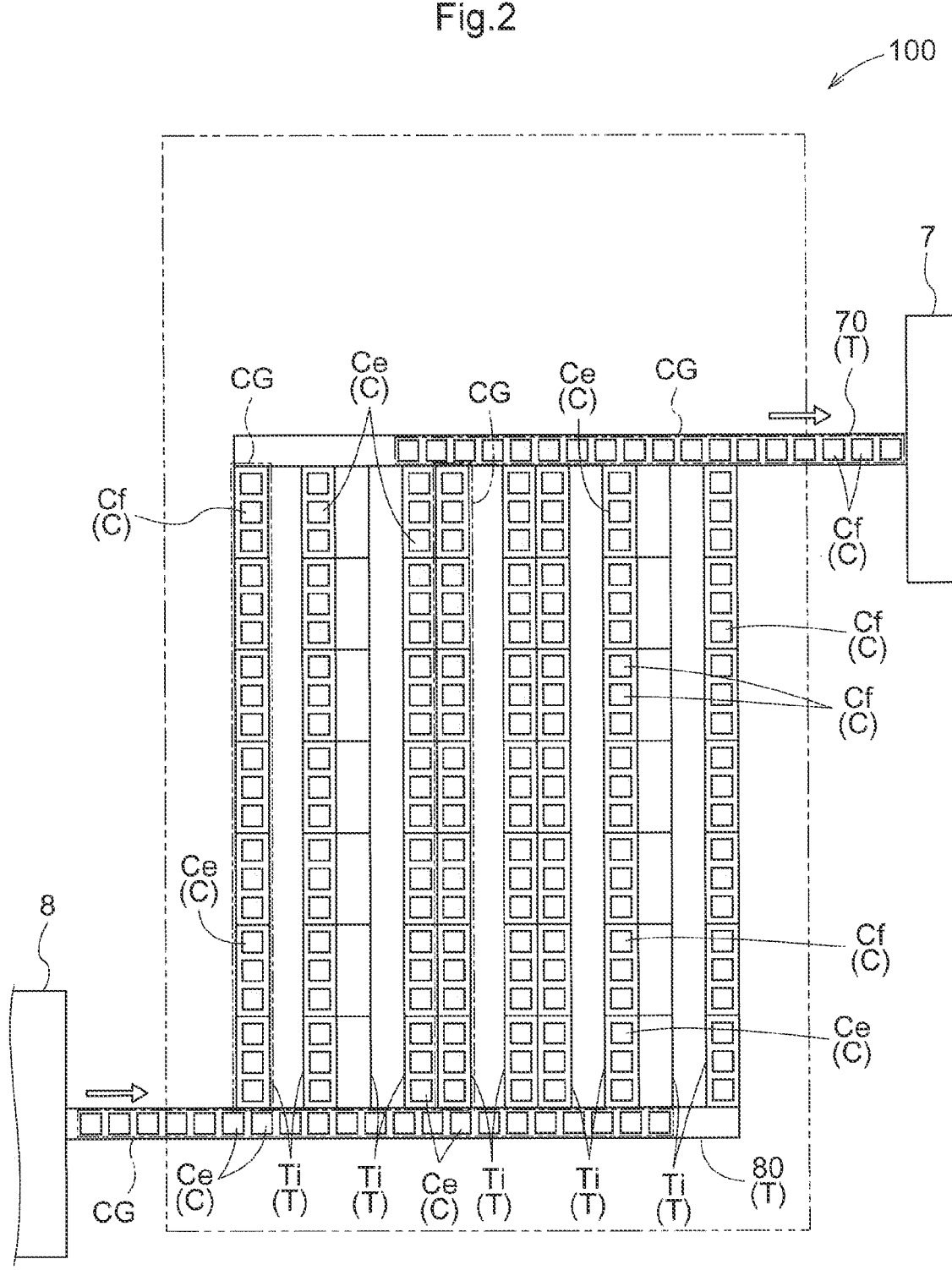
FIG. 2 is an illustrative diagram showing transport routes along which containers are transported by a transport device.

As shown in FIG. 2, the article transport facility 100 includes a transport device T that is arranged below the traveling surface F (see FIG. 1) and transports articles W below the traveling surface F. In the present embodiment, the transport device T is configured to transport containers C that are each for storing at least one article W. Also, the article transport facility 100 includes an empty container supply section 8 for supplying empty containers Ce, which are containers C not storing any article W, and a shipping section 7 for shipping filled containers Cf, which are containers C storing at least one article W. In the present embodiment, the transport device T includes an empty container loading section 80 for receiving empty containers Ce supplied from the empty container supply section 8, a filled container unloading section 70 for discharging filled containers Cf that are storing articles W and were received in receiving sections 110, and receiving/transporting sections Ti provided so as to connect the empty container loading section 80 and the filled container unloading section 70. In the present embodiment, the transport device T includes a plurality of receiving/transporting sections Ti, and the receiving/transporting sections Ti are provided so as to connect the empty container loading section 80 and the filled container unloading section 70. In this example, a plurality of receiving/transporting sections Ti are arranged side by side in parallel in a plan view. In the present embodiment, the empty container loading section 80, the filled container unloading section 70, and the receiving/transporting sections Ti are each constituted by a conveyor.

As shown in FIGS. 1 and 2, the receiving sections 110 are arranged so as to be overlapped with the receiving/transporting sections Ti in a plan view. Containers C are arranged at positions corresponding to the receiving sections 110 in the receiving/transporting sections Ti. Accordingly, articles W received from the article transport vehicles V in the receiving sections 110 are guided through the openings 110a to positions below the traveling surface F, and are then stored in containers C arranged in the receiving/transporting sections Ti (see FIGS. 3 and 4 as well). In the present embodiment, a plurality of receiving sections 110 are arranged side by side with each other for each of the receiving/transporting sections Ti. Also, a container C is arranged at a position corresponding to each of the receiving sections 110, or more specifically at a position directly under each of the receiving sections 110.

A receiving section group 110G is a group of receiving sections 110 among the plurality of receiving sections 110, and an article group is a group of articles W that were guided from the receiving section group 110G to a lower position. In the present embodiment, the receiving sections 110 that are arranged side by side in correspondence with one receiving/transporting section Ti constitute one receiving section group 110G. In this example, a plurality of receiving/transporting sections Ti are provided as previously described, and therefore a plurality of receiving section groups 110G are correspondingly provided.

The transport device T is configured to transport a plurality of articles W synchronously and simultaneously in an article group. In the present embodiment, the transport device T is configured to transport a plurality of containers C synchronously and simultaneously in a container group CG that includes containers C that can store articles W received by the receiving sections 110.

In the present embodiment, the empty container loading section 80 is configured to transport a plurality of containers C synchronously and simultaneously in a container group CG that includes the same number of containers C as receiving sections 110 arranged in correspondence with one receiving/transporting section Ti. The receiving/transporting sections Ti and the filled container unloading section 70 are similarly configured to transport a plurality of containers C synchronously and simultaneously in a container group CG. In the illustrated example, 21 receiving sections 110 are provided for each receiving/transporting section Ti, each container group CG includes 21 containers C, and the empty container loading section 80 and the filled container unloading section 70 each transport 21 containers C synchronously and simultaneously in a container group CG. In this case, the receiving/transporting sections Ti each transport a group of 21 containers C after articles W have been stored in all of the 21 containers C included in that container group CG.

For example, in this article transport facility 100, articles W are sorted by being received by specified receiving sections 110 that have been designated based on predetermined sorting information indicating types, quantities, shipping destinations, and the like of the articles W. The sorted articles W are stored in the containers C and transported by the transport device T.

The article transport facility 100 includes door members 111 (see FIGS. 3 and 4) that are provided in correspondence with the openings 110a and change in orientation between an open orientation in which the corresponding openings 110a are open and a closed orientation in which the corresponding openings 110a are closed, and a door control section Hs (see FIG. 6) that controls the door members 111. Each door member 111 keeps the corresponding opening 110a closed until the receiving section 110 has received at least one article W that is to be sorted based on the sorting information. The door member 111 then opens the opening 110a after the receiving section 110 has received at least one article W that is to be sorted based on the sorting information. Accordingly, the articles W sorted to the receiving sections 110 by the article transport vehicles V pass through the openings 110a and are guided to positions below the traveling surface F, and are stored in containers C arranged in the receiving/transporting sections Ti.

In each of the article supply sections 9, an article W for which a specified receiving section 110 has been designated as a transport destination based on the sorting information is supplied to an article transport vehicle V by a supply entity such as a worker or a robot, for example. The article transport vehicle V that received the article W in the article supply section 9 then travels along a passage R (see FIG. 3, for example) defined on the traveling surface F, and transports the article W to the receiving section 110 that was designated based on the sorting information.

Each of the receiving sections 110 is provided with a position information holder (not shown) that holds position information indicating a position corresponding to the receiving section 110. An article transport vehicle V travels toward a specified receiving section 110 that was designated as a transport destination, and when a position information detector (not shown) detects the position information held by the position information holder that corresponds to the specified receiving section 110, the article transport vehicle V stops at that position (or transitions to a low-speed traveling state) and transfers an article W to that receiving section 110. The position information holder is constituted by, for example, an indicator such as a barcode (e.g., a two-dimensional barcode) that indicates position information, a storage element such as an RFID tag (radio frequency identifier tag) that stores position information, or a signal transmitter such as a beacon that emits a signal indicating position information. For example, if the position information holder is a barcode, the position information detector is configured as a barcode reader, if the position information holder is an RFID tag, the position information detector is configured as an RFID reader, and if the position information holder is a beacon, the position information detector is configured as a signal receiver.

As shown in FIG. 1, the article transport facility 100 includes frame units SU that form portions of the traveling surface F. The portion indicated by the reference sign "SU" in FIG. 1 is one frame unit SU. In this example, a plurality of frame units SU are arranged side by side in a grid pattern in a plan view to form one traveling surface F. Note that in FIG. 1, in order to facilitate understanding one frame unit SU, the reference sign "SU" denotes one of a plurality of frame units SU that form one traveling surface F.

Figure 3:
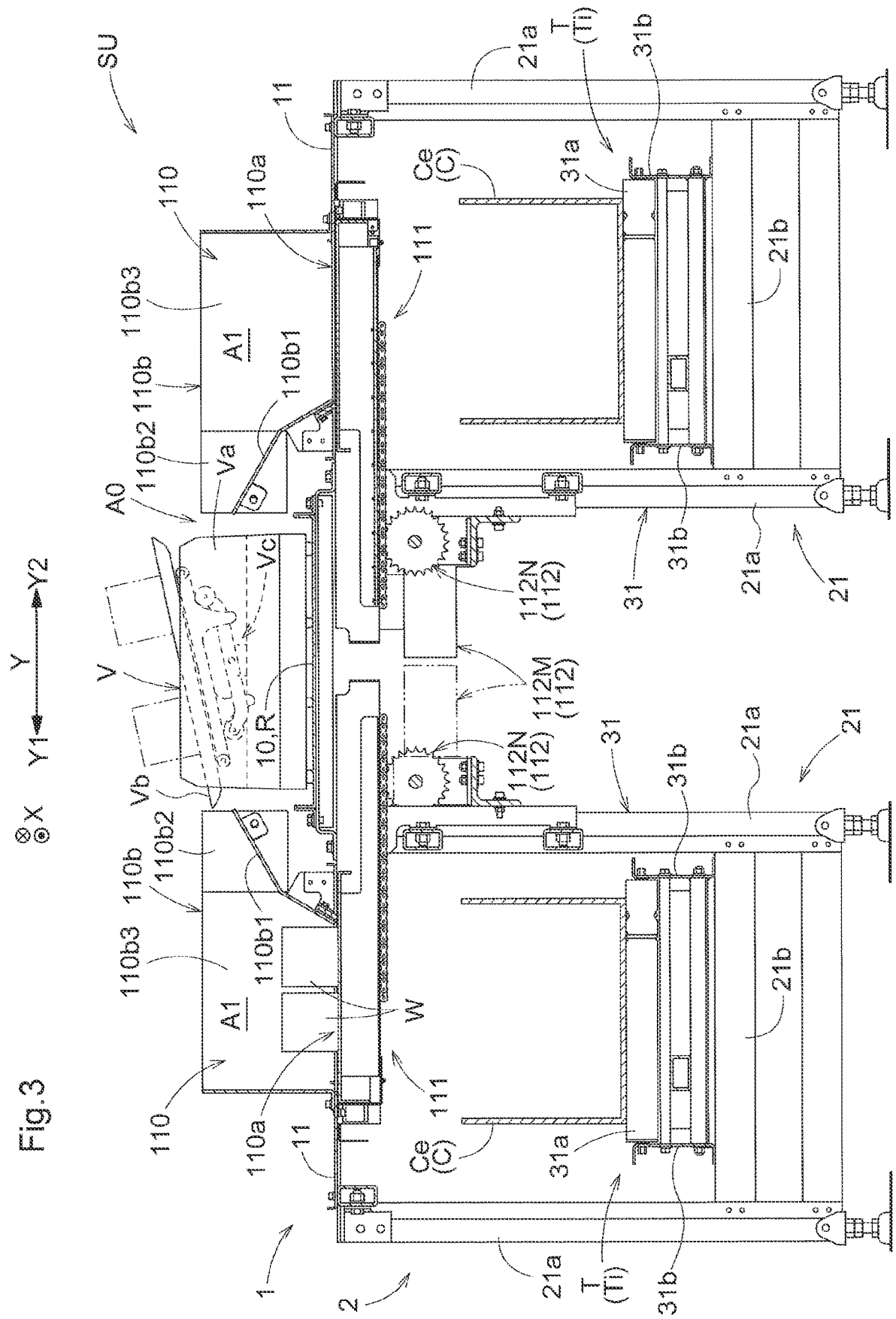
FIG. 3 is a traveling direction view showing how articles are transferred to a receiving section by an article transport vehicle.
Figure 4:
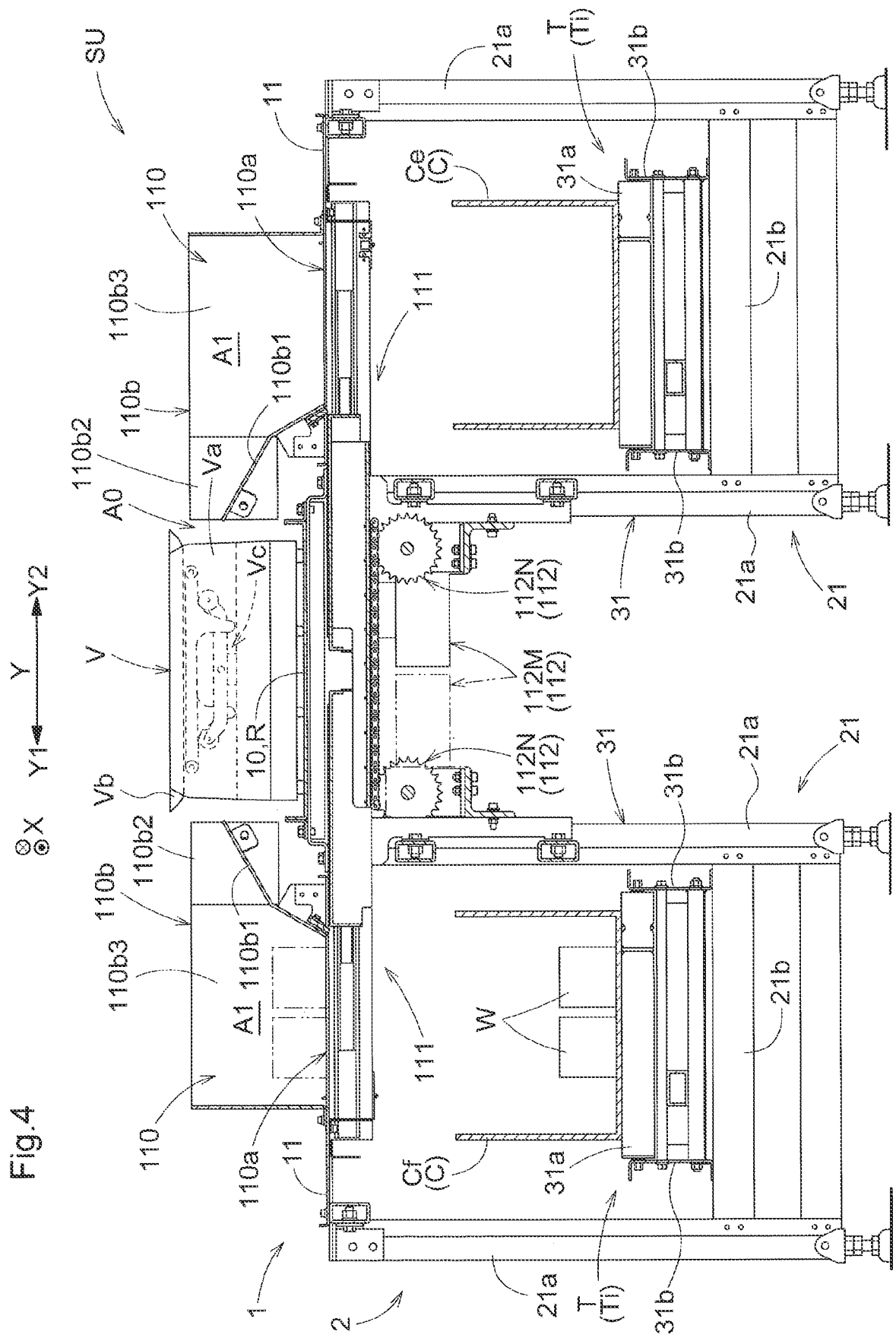
FIG. 4 is a traveling direction view showing how articles are dropped from the receiving section onto the transport device.
Figure 5:
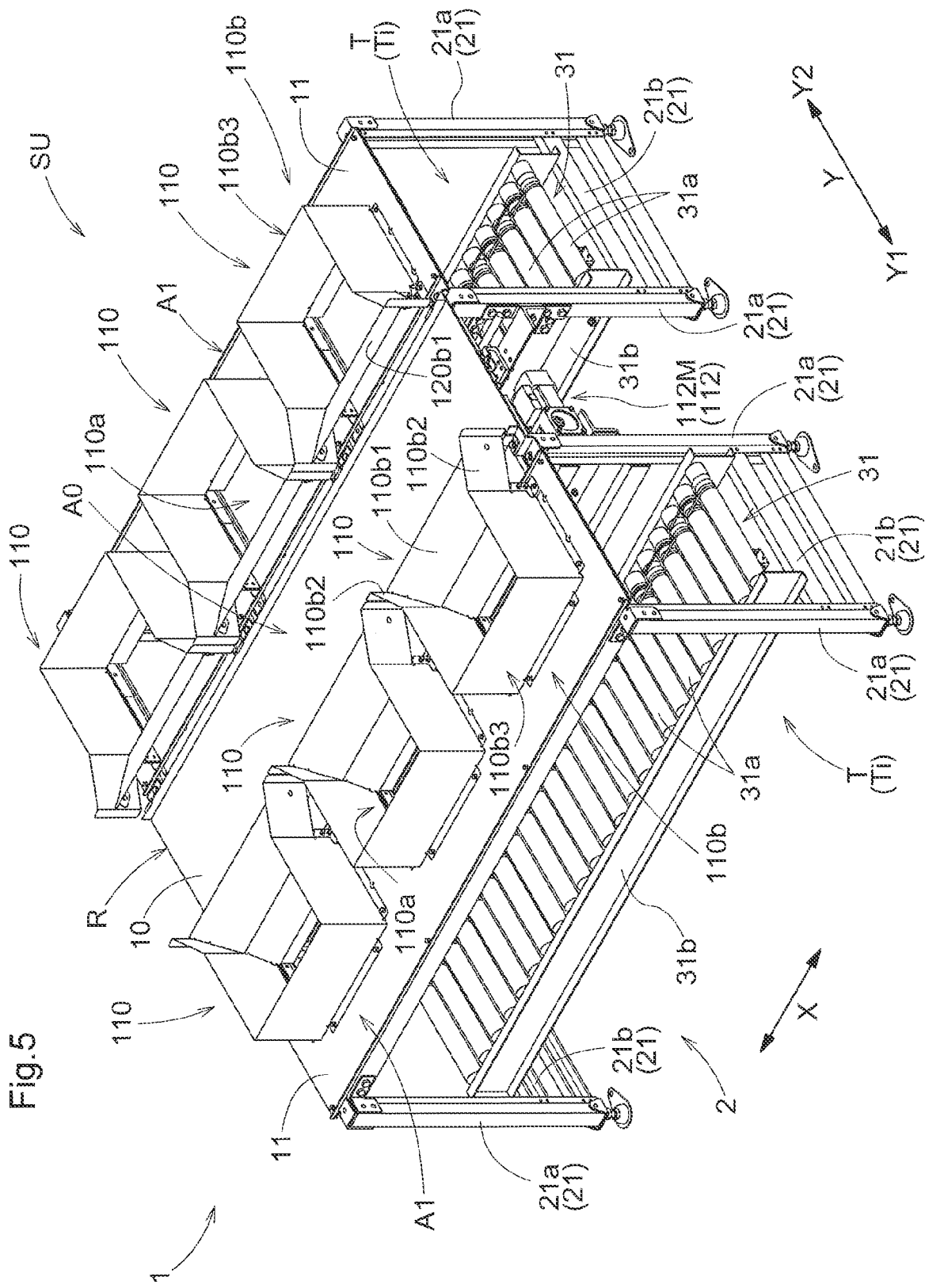
FIG. 5 is a perspective view of a frame unit.

FIGS. 3 to 5 show one frame unit SU. More specifically, FIGS. 3 and 4 are traveling direction views of the frame unit SU, and FIG. 5 is a perspective view of the frame unit SU. The following continuing description is given mainly with reference to these drawings.

Article Transport Vehicle

As shown in FIGS. 3 and 4, each article transport vehicle V is configured to travel along a passage R defined by the traveling surface F (see FIG. 1) so as to transport an article W from an article supply section 9 to a receiving section 110. In the following description, the direction in which the article transport vehicle V travels along the passage R will be referred to as the "traveling direction X", and the direction orthogonal to the traveling direction X in a plan view will be referred to as the "width direction Y". Also, one side in the width direction Y will be referred to as the "first side Y1 in the width direction", and the other side will be referred to as the "second side Y2 in the width direction".

In the present embodiment, the article transport vehicle V includes a carriage body Va that has wheels, a support portion Vb for supporting an article W, and a transfer portion Vc for operating the support portion Vb so as to transfer the article W.

In the present embodiment, the support portion Vb is configured such that an article W can be placed thereon. In this example, the support portion Vb is plate-shaped, and an article W is placed on the upper surface thereof. Also, in this example, the support portion Vb is provided on the upper portion of the carriage body Va, and is configured to swing about an axis extending along the traveling direction X relative to the carriage body Va.

The transfer portion Vc includes a drive source such as a motor. In the present embodiment, the transfer portion Vc is configured to swing the support portion Vb about the axis extending along the traveling direction X relative to the carriage body Va. As shown in FIG. 3, the transfer portion Vc is configured to tilt the support portion Vb in the width direction Y to cause the article W to slide in the width direction Y on the support portion Vb, and thus transfer the article W to a transfer location outward of the article transport vehicle V in the width direction Y. In this example, by swinging the support portion Vb, the transfer portion Vc transfers the article W to the receiving section 110 (transfer location) that is located on either the first side Y1 in the width direction or the second side Y2 in the width direction relative to the article transport vehicle V. Note that FIG. 3 shows how an article W is transferred to the receiving section 110 arranged on the first side Y1 in the width direction relative to the article transport vehicle V.

Frame Unit

The frame unit SU includes a top plate section 1 and a support leg section 2 that supports the top plate section 1 from below. The top plate section 1 is coupled to the upper portion of the support leg section 2, and is arranged at a position at a certain distance above the floor surface. In the present embodiment, a portion of the above-described transport device T is included in the frame unit SU. Specifically, the receiving/transporting section Ti, which is a portion of the transport device T, is included in the frame unit SU. The transport device T will be described in detail later.

The top plate section 1 has a passage area A0 provided with the passage R for traveling of the article transport vehicle V, and receiving areas A1 that are each provided with a plurality of receiving sections 110 that receive articles W from the article transport vehicle V. In the present embodiment, a pair of receiving areas A1 are arranged on opposite sides of the passage area A0 in the width direction Y.

In the present embodiment, the top plate section 1 includes a passage top plate member 10 that forms the passage area A0, and receiving top plate members 11 that form the receiving areas A1. In other words, in this example, the passage R for the article transport vehicle V is provided on the passage top plate member 10, and the receiving sections 110 are provided on the receiving top plate members 11.

The receiving top plate members 11 are arranged on opposite sides of the passage top plate member 10 in the width direction Y. The passage top plate member 10 is configured to couple the pair of receiving top plate members 11 in the width direction Y. The passage top plate member 10 and the pair of receiving top plate members 11 are detachably coupled by fastening members such as bolts.

As shown in FIG. 5, in the present embodiment, a plurality of receiving sections 110 are arranged side by side along the traveling direction X in the receiving area A1. In the illustrated example, three receiving sections 110 are arranged side by side along the traveling direction X in each of the receiving areas A1.

As shown in FIGS. 3 and 4, each of the receiving sections 110 includes an opening 110a that passes through the top plate section 1 in the up-down direction. In this example, the opening 110a is formed so as to pass through the receiving top plate member 11 in the up-down direction. Articles W are introduced (transferred) to the openings 110a by the article transport vehicle V.

In the present embodiment, each of the receiving sections 110 includes a guide member 110b that guides an article W received from the article transport vehicle V to the opening 110a. Accordingly, an article W can be appropriately received from the article transport vehicle V.

In the present embodiment, the guide member 110b includes an inclined portion 110b1 that is arranged adjacent, on the passage area A0 side in the width direction Y, to the opening 110a and is inclined downward while extending toward the opening 110a. An article W received from the article transport vehicle V at a position above the opening 110a and on the passage area A0 side in the width direction Y is guided by the inclined portion 110b1 so as to move toward the opening 110a.

As shown in FIGS. 3 to 5, in the present embodiment, the guide member 110b includes a pair of guide wall portions 110b2 that guide an article W received from the article transport vehicle V to an appropriate position in the traveling direction X. The pair of guide wall portions 110b2 are arranged at positions adjacent, on the passage area A0 side in the width direction Y, to the opening 110a and separated from each other in the traveling direction X. In this example, the pair of guide wall portions 110b2 are in a tapered arrangement in which the distance between them in the traveling direction X becomes smaller from the passage area A0 side in the width direction Y toward the opening 110a. Accordingly, the article W received from the article transport vehicle V can be appropriately guided to the opening 110a. In this example, the guide wall portions 110b2 are respectively connected to the two end portions of the inclined portion 110b1 in the traveling direction X, and are formed so as to extend along the up-down direction.

Also, in the present embodiment, the guide member 110b includes a peripheral wall portion 110b3 that surrounds the opening 110a. The peripheral wall portion 110b3 is formed so as to rise upward from the periphery of the opening 110a. Accordingly, an article W received from the article transport vehicle V can be prevented from protruding outward from the opening 110a, and the article W can be appropriately guided to the opening 110a. In this way, the guide member 110b functions as a chute that guides the article W to the opening 110a.

As described above, the support leg section 2 is configured to support the top plate section 1 from below. The support leg section 2 includes leg members 21 arranged so as to be overlapped with the receiving area A1 in a plan view.

The receiving top plate member 11 is supported from below by the leg members 21. In the present embodiment, the passage top plate member 10 is supported by the leg members 21 via the receiving top plate member 11. In other words, in the present embodiment, dedicated support members for supporting the passage top plate member 10 are not provided.

In the present embodiment, the leg members 21 include a plurality of strut members 21a that support the receiving top plate member 11 and a plurality of beam members 21b that couple the strut members 21a to each other. In this example, the strut members 21a are provided at positions corresponding to the four corners of the receiving top plate member 11 that is rectangular in a plan view. In other words, at least four strut members 21a are provided for the receiving top plate member 11. The beam members 21b extend along the width direction Y so as to each couple a pair of strut members 21a arranged adjacent to each other in the width direction Y, at positions corresponding to the two end portions of the receiving top plate member 11 in the traveling direction X. In other words, in this example, the pair of beam members 21b extend along the width direction Y at positions apart from each other in the traveling direction X. The pair of beam members 21b are arranged at the same height as each other. However, the number of strut members 21a and beam members 21b included in the leg members 21 is not limited to the above configuration, and can be set as desired.

In the present embodiment, the frame unit SU includes the above-described door members 111 and the door drive section 112 that drives the door members 111 to change the orientation of the door members 111.

The door members 111 are provided in correspondence with the openings 110a, and are configured to change in orientation between an open orientation in which the openings 110a are open and a closed orientation in which the openings 110a are closed.

In the present embodiment, the door drive section 112 includes a drive source 112M and a transmission mechanism 112N that transmits driving power from the drive source 112M to the door members 111. In this example, the drive source 112M is constituted by a motor. Also, the transmission mechanism 112N includes power transmission members such as a shaft member, a sprocket, and a chain. However, the present invention is not limited to this, and the transmission mechanism 112N may include power transmission members such as a rack and a pinion or a pulley and a belt.

As shown in FIG. 3, in the present embodiment, each of the door members 111 remains in the closed orientation, in which the opening 110a is closed, until an article W has been transported to the receiving section 110 by the article transport vehicle V. Accordingly, an article W received by a receiving section 110 is held in the receiving section 110 for a certain period of time. Although described in detail later, as shown in FIG. 4, the door member 111 changes to the open orientation, in which the opening 110a is open, at an appropriately determined timing. Accordingly, the article W held by the receiving section 110 falls downward through the opening 110a. The dropped article W is stored in a container C arranged on the transport device T, as will be described later.

Transport Device

Next, the transport device T will be described. The transport device T is arranged below the traveling surface F (see FIG. 1), and is configured to transport articles W below the traveling surface F. In the present embodiment, the transport device T is a conveyor unit that transports articles W along a predetermined transport direction while the articles W are placed thereon.

As shown in FIGS. 1 and 2, in the present embodiment, the receiving/transporting sections Ti, the empty container loading section 80, and the filled container unloading section 70 are constituent elements of the transport device T. Specifically, the transport device T includes the receiving/transporting sections Ti that are provided in correspondence with the receiving section groups 110G and each store and transport a group of articles received by the corresponding receiving section group 110G in a container group CG, an empty container loading section 80 that is connected to upstream end portions, with respect to the transport direction, of the receiving/transporting sections Ti and transports a container group CG made up of empty containers Ce to each of the receiving/transporting sections Ti, and a filled container unloading section 70 that is connected to downstream end portions, with respect to the transport direction, of the receiving/transporting sections Ti and receives a container group CG made up of filled containers Cf from each of the receiving/transporting sections Ti and transports the received container groups CG. In the present embodiment, the empty container loading section 80 corresponds to an "upstream transport section", and the filled container unloading section 70 corresponds to a "downstream transport section". Note that in FIG. 2, containers C shown in white are empty containers Ce, and containers C colored gray are filled containers Cf.

As shown in FIGS. 3 and 4, the frame units SU each include a portion of the transport device T. In the present embodiment, receiving/transporting sections Ti, which are portions of the transport device T, are included in each of the frame units SU. In this example, two receiving/transporting sections Ti are included in each frame unit SU. In the following, the receiving/transporting sections Ti may be simply referred to as the "transport device T".

The transport device T is configured to support, at positions below the top plate section 1, articles W that have been received by the receiving sections 110 and have passed through the openings 110a. In the present embodiment, the transport device T is configured to transport containers C, and can transport empty containers Ce that are not storing any articles W and filled containers Cf that are storing articles W. In other words, in this example, the transport device T is configured to indirectly transport articles W via the containers C.

The transport device T extends along the arrangement direction in which the receiving sections 110 that belong to the receiving section group 110G (see FIG. 1) are aligned (the traveling direction X in this example). In the present embodiment, the transport device T is arranged so as to pass directly under the openings 110a of the receiving sections 110 that belong to the receiving section group 110G (see FIG. 1).

In the present embodiment, the transport device T includes a conveying member 31a that supports containers C and transports them in the transport direction, and a conveying support member 31b that supports the conveying member 31a. In this example, the transport device T is constituted by a roller conveyor, and the conveying member 31a is constituted by rollers. The conveying support member 31b is constituted by a frame to which the conveying member 31a is coupled. In this example, the conveying support member 31b rotatably supports the rollers that constitute the conveying member 31a.

In the present embodiment, the transport device T is supported by leg members 21. Specifically, the transport device T is supported in a state of being mounted on beam members 21b of the leg members 21. In this example, the conveying support member 31b is fixed to the beam members 21b of the leg members 21 while being in contact with the beam members 21b from above. According to such a configuration, the transport device T can be easily attached to the leg members 21.

Note that the mechanical configuration of the receiving/transporting sections Ti, which are portions of the transport device T, has been described above. The mechanical configurations of the empty container loading section 80 and the filled container unloading section 70, which are other portions of the transport device T, may be similar to that of the receiving/transporting sections Ti. In this example, the empty container loading section 80 and the filled container unloading section 70 are constituted by a roller conveyor, similarly to the receiving/transport section Ti.

Control Configuration

Next, a control configuration of the article transport facility 100 will be described mainly with reference to FIGS. 6 to 8.

Figure 6:
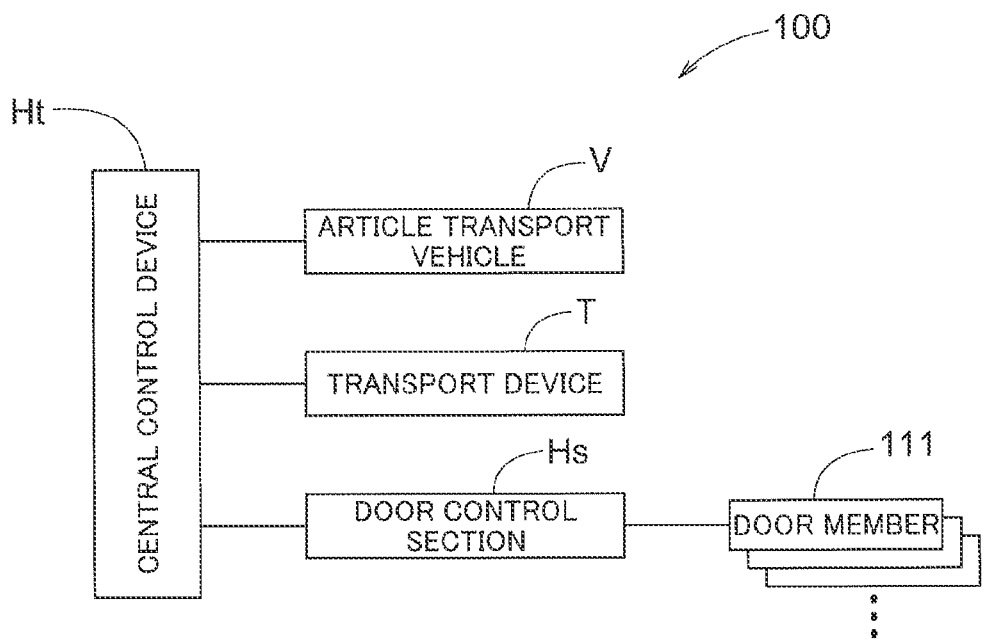
FIG. 6 is a control block diagram of the article transport facility.

As shown in FIG. 6, in the present embodiment, the article transport facility 100 includes a central control device Ht that controls the article transport vehicles V, the transport device T, and a door control section Hs. Although not shown in detail, each of the article transport vehicles V includes a transport vehicle control section that controls the constituent elements thereof. Also, the transport device T includes a transport device control section that controls the constituent elements thereof. The central control device Ht is configured to be able to communicate with the transport vehicle control sections (article transport vehicles V), the transport device control section (transport device T), and the door control section Hs, be able to acquire the operation statuses of such control sections, and be able to output commands to such control sections. The central control device Ht, the transport vehicle control sections, the transport device control section, and the door control section Hs each include a processor such as a microcomputer, peripheral circuits such as a memory, and the like. Various functions are realized by cooperation between such hardware and a program executed on the processor of a computer or the like.

As described above, the door control section Hs is configured to control a plurality of door members 111. Specifically, the door control section Hs is configured such that all of the door members 111 provided in a receiving section group 110G are opened and closed synchronously and simultaneously (see FIG. 1). In other words, all of the door members 111 provided in a receiving section group 110G are simultaneously put in the closed orientation (see FIG. 3) or simultaneously put in the open orientation (see FIG. 4) under control of the door control section Hs. Note that the phrase "open/close simultaneously" includes not only the case where each door member 111 opens and closes at the same time, but also the case where there is a slight time lag in the opening and closing of each door member 111. In other words, it is sufficient that the door members 111 controlled by the door control section Hs are opened and closed in the same time period. For example, the door control section Hs opens and closes the door members 111 such that the operation timings of the door members 111 provided in a receiving section group 110G are overlapped with each other.

In the present embodiment, the central control device Ht can execute sorting processing Ps in which the article transport vehicles V are controlled such that articles W designated based on specified sorting information are sorted to receiving sections 110 designated based on the sorting information. As described above, "specified sorting information" includes various types of information such as the type, quantity, and shipping destinations of the articles W, and is appropriately determined according to need, the characteristics of the facility, and the like. In the present embodiment, one or more articles W are sorted by the sorting processing Ps to each of all of the receiving sections 110 that belong to a receiving section group 110G.

In the present embodiment, the central control device Ht can execute container replacement processing Pr in which the transport device T is controlled such that a container group CG made up of filled containers Cf is replaced with a container group CG made up of empty containers Ce. As shown in FIG. 2, in the container replacement processing Pr according to the present embodiment, a container group CG made up of filled containers Cf is replaced with a container group CG made up of empty containers Ce in a target receiving/transporting section Ti. Specifically, in the container replacement processing Pr, a container group CG made up of filled containers Cf placed on the receiving/transporting section Ti is transferred to the filled container unloading section 70 (downstream transport section), and a container group CG made up of empty containers Ce transported by the empty container loading section 80 (upstream transport section) is transferred to the empty receiving/transporting section Ti. The transport device T arranges the container group CG made up of empty containers Ce at a standby position set in correspondence with the receiving section group 110G in the receiving/transporting section Ti. In this example, the standby positions of the containers C that belong to the container group CG are set at positions directly under the receiving sections 110 that belong to the receiving section group 110G.

In the present embodiment, the central control device Ht can execute simultaneous closing processing Pc for controlling the door control section Hs to simultaneously close all of the door members 111 provided in a receiving section group 110G, and simultaneous opening processing Po for controlling the door control section Hs to simultaneously open all of the door members 111 provided in a receiving section group 110G. In the simultaneous closing processing Pc, it is sufficient that the operation timings for closing each of the door members 111 are overlapped with each other. Also, in the simultaneous opening processing Po, it is sufficient that the operation timings for opening the door members 111 are overlapped with each other. In the present embodiment, in the simultaneous closing processing Pc, all of the door members 111 provided in a receiving section group 110G are put in the closed orientation at the same time. Also, in the simultaneous opening processing Po, all of the door members 111 provided in a receiving section group 110G are put in the open orientation at the same time. When the simultaneous closing processing Pc is executed, the openings 110a are closed, and the receiving sections 110 are put in a state where articles W can be stored. When the simultaneous opening processing Po is executed, the openings 110a are opened, and the articles W that were sorted and stored in the receiving sections 110 become stored in the empty containers Ce arranged at the standby positions on the receiving/transporting section Ti.

Figure 7:
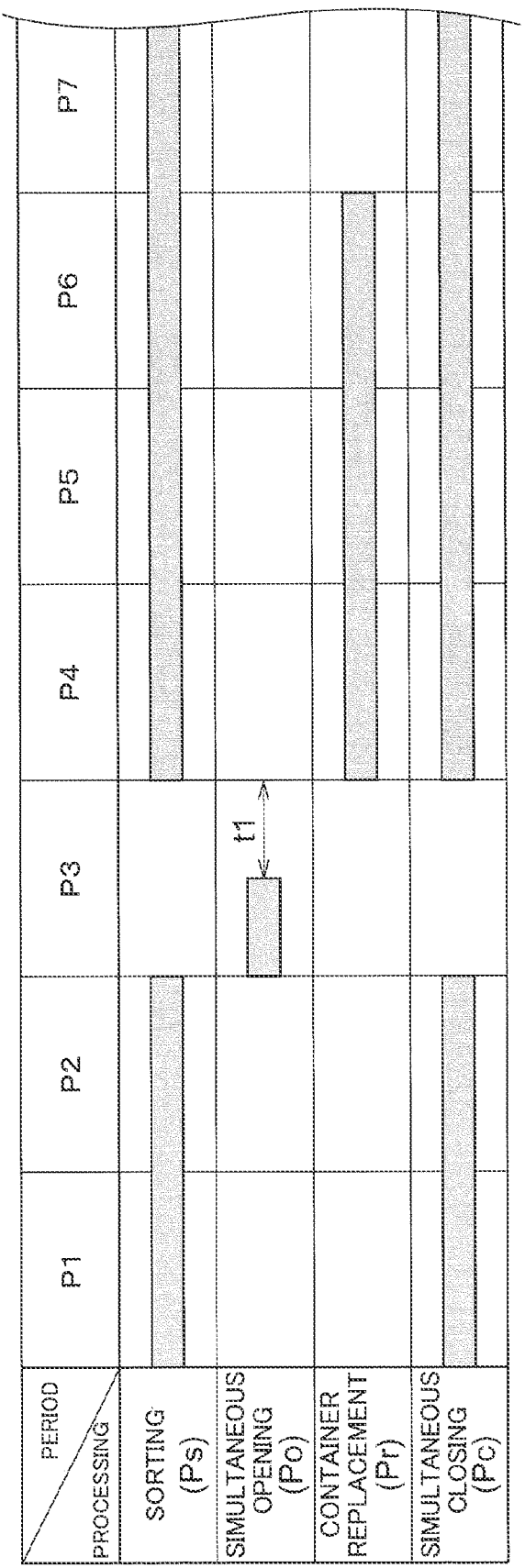
FIG. 7 is a timing chart of processing steps.

FIG. 7 is a timing chart showing processing executed by the central control device Ht. FIG. 7 shows processing steps executed in first to seventh phases P1 to P7. Note that FIG. 7 shows the timings at which processing steps are executed, and does not show the lengths of processing times for the processing steps.

As shown in FIG. 7, in the present embodiment, the central control device Ht continuously executes the simultaneous closing processing Pc until completion of the sorting processing Ps for all of the receiving sections 110 that belong to a receiving section group 110G. Accordingly, the articles W sorted to the receiving sections 110 through the sorting processing Ps can be stored in the receiving sections 110. In this example, the central control device Ht executes the sorting processing Ps and the simultaneous closing processing Pc in periods that overlap each other. In the illustrated example, the central control device Ht executes the sorting processing Ps and the simultaneous closing processing Pc in parallel in the first phase P1 and the second phase P2. Also, the central control device Ht executes the sorting processing Ps and the simultaneous closing processing Pc in parallel in the fourth to seventh phases P4 to P7. In other words, in the present embodiment, the central control device Ht executes the simultaneous closing processing Pc and the sorting processing Ps in the same period. However, the central control device Ht may execute the simultaneous closing processing Pc regardless of whether or not the sorting processing Ps is executed.

In the present embodiment, after the sorting processing Ps is complete for all of the receiving sections 110 that belong to the receiving section group 110G, the central control device Ht ends the simultaneous closing processing Pc and executes the simultaneous opening processing Po. Accordingly, the group of articles stored in all of the receiving sections 110 that belong to the receiving section group 110G are stored in the containers in the container group CG supported by the transport device T. In the illustrated example, the central control device Ht ends the sorting processing Ps at the same time as the end of the second phase P2, and starts the simultaneous opening processing Po at the same time as the start of the third phase P3.

In the present embodiment, the central control device Ht executes the container replacement processing Pr after the simultaneous opening processing Po is complete. Due to this container replacement processing Pr, the container group CG made up of the filled containers Cf that are storing the sorted articles W is replaced with a container group CG made up of empty containers Ce. Here, completion of the simultaneous opening processing Po means that all of the door members 111 provided in the receiving section group 110G are in a state in which the opening 110a is completely open (fully open orientation) due to execution of the simultaneous opening processing Po. In the present embodiment, the central control device Ht executes the container replacement processing Pr after a first specified time t1 has elapsed from completion of the simultaneous opening processing Po. Accordingly, the container replacement processing Pr can be executed after the group of articles stored in all of the receiving sections 110 that belong to the receiving section group 110G have been reliably transferred to the transport device T. However, instead of using the lapse of the first specified time t1 as a trigger, the central control device Ht may execute the container replacement processing Pr when a sensor (not shown) has detected that a group of articles stored in all of the receiving sections 110 that belong to the receiving section group 110G have been transferred to the transport device T. In the illustrated example, the central control device Ht starts the container replacement processing Pr at the same time as the start of the fourth phase P4, which occurs after the lapse of the first specified time t1 from completion of the simultaneous opening processing Po during the third phase P3.

In the present embodiment, the central control device Ht executes the simultaneous closing processing Pc after the lapse of the first specified time t1 from completion of the simultaneous opening processing Po. In this example, the central control device Ht starts the container replacement processing Pr and the simultaneous closing processing Pc at the same time after the lapse of the first specified time t1 from completion of the simultaneous opening processing Po. When the openings 110a are closed due to execution of the simultaneous closing processing Pc, the receiving sections 110 enter in a state where articles W sorted by the article transport vehicle V can be stored thereon. In other words, according to the above configuration, containers C can be transported by the transport device T below the traveling surface F while articles W are sorted by the article transport vehicle V above the traveling surface F. In the illustrated example, the central control device Ht simultaneously starts the container replacement processing Pr and the simultaneous closing processing Pc at the same time as the start of the fourth phase P4, which occurs after the lapse of the first specified time t1 from completion of the simultaneous opening processing Po during the third phase P3.

In the present embodiment, the central control device Ht executes the sorting processing Ps and the container replacement processing Pr in parallel. In other words, the central control device Ht executes the sorting processing Ps and the container replacement processing Pr in periods that are overlapped with each other. In the present embodiment, due to the simultaneous closing processing Pc and the sorting processing Ps being executed in the same period, sorted articles W are not transferred to the transport device T below the traveling surface F during execution of the sorting processing Ps. This makes it possible to appropriately execute the sorting processing Ps and the container replacement processing Pr in parallel. Due to such processing being executed in parallel, the sorting processing Ps can be performed more efficiently than in the case where the sorting processing Ps is interrupted during execution of the container replacement processing Pr.

In the present embodiment, the central control device Ht starts the sorting processing Ps after the lapse of the first specified time t1 from completion of the simultaneous opening processing Po. In this example, the central control device Ht starts the container replacement processing Pr, the simultaneous closing processing Pc, and the sorting processing Ps at the same time after the lapse of the first specified time t1 from completion of the simultaneous opening processing Po. In the illustrated example, the central control device Ht starts the container replacement processing Pr, the simultaneous closing processing Pc, and the sorting processing Ps at the same time as the start of the fourth phase P4.

Figure 8:
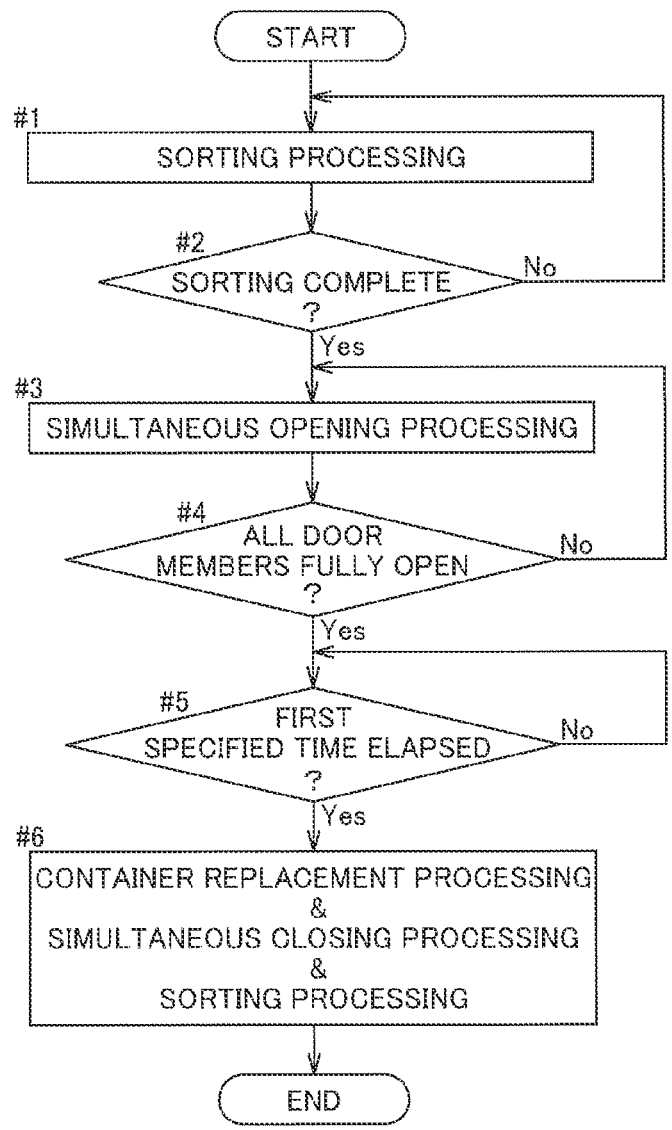
FIG. 8 is a flowchart of processing steps.

FIG. 8 is a flowchart of processing executed by the central control device Ht. Hereinafter, the procedure of processing steps performed by the central control device Ht will be described with reference to FIG. 8.

The central control device Ht starts the sorting processing Ps (step #1), and then when the sorting processing Ps is complete (step #2: Yes), starts the simultaneous opening processing Po (step #3). Subsequently, the central control device Ht determines whether or not the door members 111 provided in all of the receiving sections 110 that belong to a receiving section group 110G are in the open orientation (step #4). This determination may be made based on information detected by a sensor (not shown) that detects the open/closed state of the door members 111, or based on control states of the door members 111 received from the door control section Hs, for example.

In the case of determining that the door members 111 provided in all of the receiving sections 110 that belong to the receiving section group 110G are in the open orientation (step #4: Yes), the central control device Ht determines that the simultaneous opening processing Po is complete. Subsequently, the central control device Ht determines whether or not the first specified time t1 has elapsed from completion of the simultaneous opening processing Po (step #5). This determination can be made based on time measured by a timer (not shown), for example.

In the case of determining that the first specified time t1 has elapsed from completion of the simultaneous opening processing Po (step #5: Yes), the central control device Ht starts at least the container replacement processing Pr (step #6). In the present embodiment, in the case of determining that the first specified time t1 has elapsed from completion of the simultaneous opening processing Po (step #5: Yes), the central control device Ht starts the container replacement processing Pr, the simultaneous closing processing Pc, and the sorting processing Ps at the same time (step #6).

Second Embodiment

Next, a second embodiment of the article transport facility 100 will be described. In the present embodiment, the timing of processing steps executed by the central control device Ht is different from that in the first embodiment. The following description focuses mainly only differences from the first embodiment. Matter not particularly described hereinafter is similar to that in the first embodiment.

Figure 9:
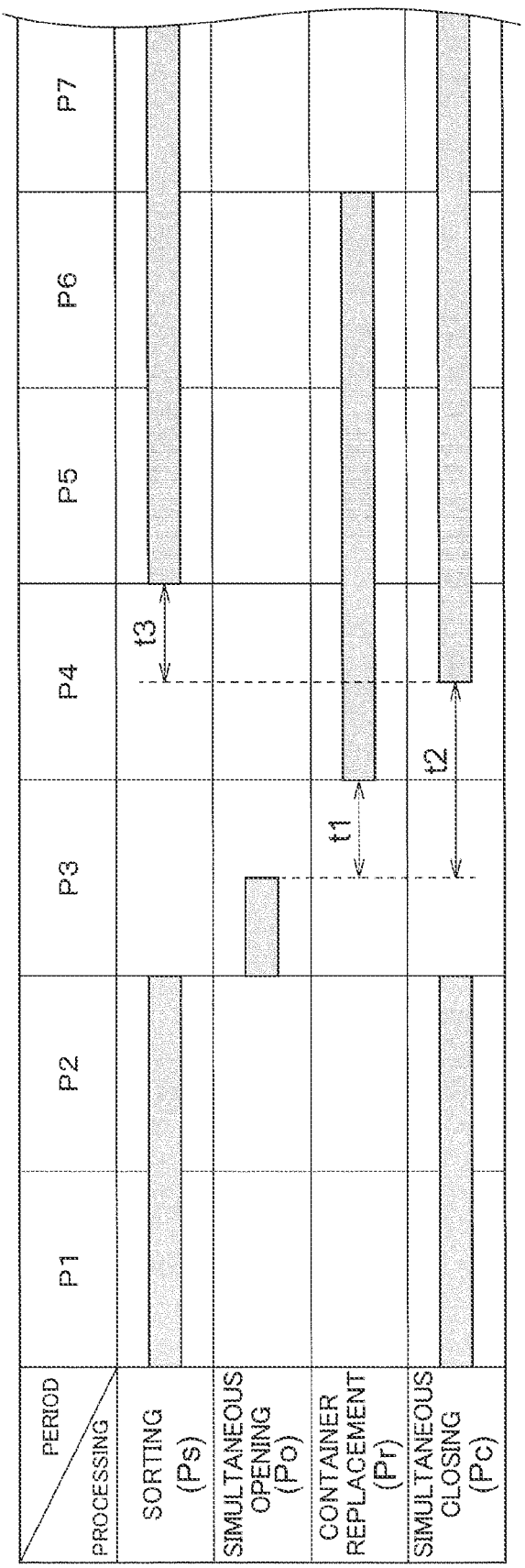
FIG. 9 is a timing chart of processing steps executed in a second embodiment.

FIG. 9 is a timing chart showing processing executed by the central control device Ht. FIG. 9 shows processing steps executed in first to seventh phases P1 to P7. Note that FIG. 9 shows the timings at which processing steps are executed, and does not show the lengths of processing times for the processing steps.

As shown in FIG. 9, in the present embodiment, the central control device Ht continuously executes the simultaneous closing processing Pc until completion of the sorting processing Ps for all of the receiving sections 110 that belong to a receiving section group 110G. Accordingly, the articles W sorted to the receiving sections 110 through the sorting processing Ps can be stored in the receiving sections 110. In this example, the central control device Ht executes the sorting processing Ps and the simultaneous closing processing Pc in periods that are overlapped with each other. In the illustrated example, the central control device Ht executes the sorting processing Ps and the simultaneous closing processing Pc in parallel in the first phase P1 and the second phase P2. Also, the central control device Ht executes the sorting processing Ps and the simultaneous closing processing Pc in parallel in the fifth to seventh phases P5 to P7. In the present embodiment, the central control device Ht executes the sorting processing Ps under the condition that at least the simultaneous closing processing Pc is being executed.

In the present embodiment, after the sorting processing Ps is complete for all of the receiving sections 110 that belong to the receiving section group 110G, the central control device Ht ends the simultaneous closing processing Pc and executes the simultaneous opening processing Po. Accordingly, the group of articles stored in all of the receiving sections 110 that belong to the receiving section group 110G are stored in the containers in the container group CG supported by the transport device T. In the illustrated example, the central control device Ht ends the sorting processing Ps at the same time as the end of the second phase P2, and starts the simultaneous opening processing Po at the same time as the start of the third phase P3.

In the present embodiment, after the simultaneous opening processing Po is complete, the central control device Ht executes the container replacement processing Pr. Due to this container replacement processing Pr, the container group CG made up of the filled containers Cf that are storing the sorted articles W is replaced with a container group CG made up of empty containers Ce. In the present embodiment, the central control device Ht executes the container replacement processing Pr after a first specified time t1 has elapsed from completion of the simultaneous opening processing Po. Accordingly, the container replacement processing Pr can be executed after the group of articles stored in all of the receiving sections 110 that belong to the receiving section group 110G have been reliably transferred to the transport device T. In the illustrated example, the central control device Ht starts the container replacement processing Pr at the same time as the start of the fourth phase P4, which occurs after the lapse of the first specified time t1 from completion of the simultaneous opening processing Po during the third phase P3.

In the present embodiment, the central control device Ht executes the simultaneous closing processing Pc after the lapse of a second specified time t2, which is longer than or equal to the first specified time t1, from completion of the simultaneous opening processing Po. In this example, the second specified time t2 is set to a longer time than the first specified time t1. Therefore, in this example, the central control device Ht executes the simultaneous closing processing Pc after the container replacement processing Pr has started after the lapse of the first specified time t1 from completion of the simultaneous opening processing Po. When the openings 110a are closed due to execution of the simultaneous closing processing Pc, the receiving sections 110 enter in a state where articles W sorted by the article transport vehicle V can be stored thereon. In other words, according to the above configuration, containers C can be transported by the transport device T below the traveling surface F while articles W are sorted by the article transport vehicle V above the traveling surface F. In the illustrated example, the central control device Ht starts the container replacement processing Pr at the same time as the start of the fourth phase P4, which occurs after the lapse of the first specified time t1 from completion of the simultaneous opening processing Po during the third phase P3, and starts the simultaneous closing processing Pc after the lapse of the second specified time t2 during the fourth phase P4.

In the present embodiment, the central control device Ht executes the sorting processing Ps and the container replacement processing Pr in parallel. In other words, the central control device Ht executes the sorting processing Ps and the container replacement processing Pr in periods that overlap each other. In the present embodiment, the execution of at least the simultaneous closing processing Pc is used as a condition for executing the sorting processing Ps, and therefore sorted articles W are not transferred to the transport device T below the traveling surface F during the execution of the sorting processing Ps. This makes it possible to appropriately execute the sorting processing Ps and the container replacement processing Pr in parallel. Due to such processing being executed in parallel, the sorting processing Ps can be performed more efficiently than in the case where the sorting processing Ps is interrupted during execution of the container replacement processing Pr.

In the present embodiment, the central control device Ht starts the sorting processing Ps after the lapse of a third specified time t3 from the start of the simultaneous closing processing Pc. Accordingly, the sorting processing Ps can be started after the openings 110a have been reliably closed, thus making it possible to avoid the case where an article W is unintentionally provided to a transport device T that is transporting a container C. In the illustrated example, the central control device Ht starts the simultaneous closing processing Pc during the fourth phase P4, and starts the sorting processing Ps at the same time as the start of the fifth phase P5, which occurs at the lapse of the third specified time t3 from the start of the simultaneous closing processing Pc.

FIG. 10 is a flowchart of processing executed by the central control device Ht. Hereinafter, the procedure of processing steps performed by the central control device Ht will be described with reference to FIG. 10.

The central control device Ht starts the sorting processing Ps (step #21), and then when the sorting processing Ps is complete (step #22: Yes), starts the simultaneous opening processing Po (step #23). Subsequently, the central control device Ht determines whether or not the door members 111 provided in all of the receiving sections 110 that belong to a receiving section group 110G are in the open orientation (step #24). This determination may be made based on information detected by a sensor (not shown) that detects the open/closed state of the door members 111, or based on control states of the door members 111 received from the door control section Hs, for example.

If it is determined that the door members 111 provided in all of the receiving sections 110 that belong to the receiving section group 110G are in the open orientation (step #24: Yes), the central control device Ht determines that the simultaneous opening processing Po is complete. Subsequently, the central control device Ht determines whether or not the first specified time t1 has elapsed from completion of the simultaneous opening processing Po (step #25). This determination can be made based on time measured by a timer (not shown), for example.

If it is determined that the first specified time t1 has elapsed from completion of the simultaneous opening processing Po (step #25: Yes), the central control device Ht starts the container replacement processing Pr (step #26). The central control device Ht then determines whether or not the second specified time t2 has elapsed from completion of the simultaneous opening processing Po (step #27). This determination can be made based on time measured by a timer (not shown), for example.

If it is determined that the second specified time t2 has elapsed from completion of the simultaneous opening processing Po (step #27: Yes), the central control device Ht starts the simultaneous closing processing Pc (step #28). Subsequently, the central control device Ht determines whether or not the third specified time t3 has elapsed from the start of the simultaneous closing processing Pc (step #29). This determination can be made based on time measured by a timer (not shown), for example.

If it is determined that the third specified time t3 has elapsed from the start of the simultaneous closing processing Pc (step #29: Yes), the central control device Ht starts the sorting processing Ps (step #30). Note that the central control device Ht continues to execute the simultaneous closing processing Pc while the sorting processing Ps is being executed.

According to the article transport facility 100 described above, the sorting of articles W by the article transport vehicle V and the transport of sorted articles W by the transport device T can both be performed efficiently.

Other Embodiments

The following describes other embodiments of the article transport facility.

(1) In the above embodiments, examples are described in which the transport device T includes a plurality of receiving/transporting sections Ti, the empty container loading section 80 (upstream transport section) that is connected to upstream end portions, with respect to the transport direction, of the receiving/transporting sections Ti, and the filled container unloading section 70 (downstream transport section) that is connected to downstream end portions, with respect to the transport direction, of the receiving/transporting sections Ti. However, the present invention is not limited to such examples, and the transport device T may not include at least either the empty container loading section 80 (upstream transport section) or the filled container unloading section 70 (downstream transport section). In this case, the loading of the empty containers Ce and the unloading of the filled containers Cf may be performed by the receiving/transporting sections Ti, or may be performed by a worker or the like. Also, the transport device T may include one receiving/transporting section Ti rather than a plurality of them.

(2) In the above embodiments, examples have been described in which the transport device T is configured to transport containers C and indirectly convey articles W via the containers C. However, the present invention is not limited to such examples, and the transport device T may be configured to directly transport articles W without using containers C. In this case, the central control device Ht may perform the following processing instead of the container replacement processing Pr described above. Specifically, a configuration is possible in which the central control device Ht controls the transport device T to execute article group transport processing for directly transporting an article group that was guided downward from a receiving section group 110G.

(3) In the above embodiments, examples have been described in which the transport device T is arranged so as to pass directly under the openings 110a of the receiving sections 110 that belong to a receiving section group 110G. However, the present invention is not limited to such examples, and the transport device T may be arranged at a position shifted, in a plan view, from the openings 110a of the receiving sections 110 that belong to the receiving section group 110G. In this case, it is preferable that a chute or the like for guiding articles W from the openings 110a to the transport device T is provided.

(4) In the above embodiments, examples have been described in which the standby positions of the containers C that belong to the container group CG are set at positions directly under all of the receiving sections 110 that belong to a receiving section group 110G. However, the present invention is not limited to such examples, and the standby positions of the containers C that belong to the container group CG may be shifted, in a plan view, from the receiving sections 110 that belong to the receiving section group 110G. In this case, it is preferable that a chute or the like for guiding articles W from the receiving sections 110 to the standby positions is provided.

(5) In the above embodiments, examples have been described in which a receiving section group 110G is constituted by a plurality of receiving sections 110 arranged side by side in correspondence with one receiving/transporting section Ti. However, the present invention is not limited to such examples, and a receiving section group 110G may be constituted by a plurality of receiving sections 110 arranged in correspondence with a plurality of receiving/transporting sections Ti. In this case, the transport device T operates a plurality of receiving/transporting sections Ti in synchronization in order to transport articles W in units of an article group made up of articles W received by all of the receiving sections 110 that belong to the receiving section group 110G. Which receiving sections 110 among all of the receiving sections 110 provided in the article transport facility 100 constitute a receiving section group 110G can be appropriately set according to need, the characteristics of the facility, and the like.

(6) In the above embodiments, examples have been described in which the transport device T is constituted by a roller conveyor. However, the present invention is not limited to such examples, and the transport device T may be constituted by a conveyor having another structure, such as a chain conveyor or a belt conveyor, or may be constituted by a transport device having another structure, such as an unmanned transport vehicle.

(7) Note that the configurations disclosed in the above-described embodiments can be applied in combination with configurations disclosed in other embodiments as long as no contradiction arises. With respect to other configurations as well, the embodiments disclosed herein are merely exemplary in all respects. Accordingly, various modifications can be appropriately made without departing from the spirit of the present disclosure.

Overview of Embodiments

The following describes the article transport facility described above.

An article transport facility that sorts and transports articles, including:

an article transport vehicle configured to transport the articles;

a traveling surface on which the article transport vehicle is travelable; and a plurality of receiving sections configured to receive the articles from the article transport vehicle, wherein the receiving sections each include an opening, and are further configured to guide the articles through the openings to a position below the traveling surface, the article transport facility further includes:

a transport device disposed below the traveling surface and configured to transport the articles below the traveling surface;

a plurality of door member provided in correspondence with the plurality of openings and configured to change in orientation between an open orientation in which the openings are open and a closed orientation in which the opening are closed; and a door control section configured to control the door members, the transport device is further configured to transport a plurality of the articles synchronously and simultaneously in an article group made up of a plurality of articles guided downward from a receiving section group made up of a plurality of receiving sections among the receiving sections, and the door control section opens and closes all of the door members provided in the receiving section group synchronously and simultaneously.

According to this configuration, during the period in which all of the door members provided in a receiving section group are synchronously and simultaneously put in the closed orientation, articles received by the receiving sections that belong to the receiving section group can be stored in the receiving sections. During this period, articles are not guided through the openings to positions below the traveling surface. For this reason, articles can be transported by the transport device arranged below the traveling surface even during the execution of article sorting processing by the article transport vehicle. Accordingly, article sorting processing can be efficiently performed by the article transport vehicle. Also, according to this configuration, due to all of the door members provided in the receiving section group being synchronously and simultaneously put in the open orientation, the articles sorted to the receiving sections that make up the receiving section group can be simultaneously guided downward and transferred to the transport device. For this reason, the group of articles guided downward from the receiving section group can be simultaneously transported by the transport device. Accordingly, the articles sorted to the receiving sections do not need to be transported individually, the transport efficiency can be improved, and the configuration of the transport device can be easily simplified.

It is preferable that the article transport facility further includes:

a central control device configured to control the article transport vehicle, the transport device, and the door control section, wherein the transport device is further configured to transport a plurality of the containers synchronously and simultaneously in a container group made up of a plurality of containers in which the articles received by the receiving sections are storable, the central control device is configured to execute:

sorting processing of controlling the article transport vehicle to sort an article designated based on specified sorting information to a receiving section designated based on the sorting information, container replacement processing of controlling the transport device to replace a container group made up of a plurality of filled containers each storing at least one article with a container group made up of a plurality of empty containers each not storing an article, simultaneous closing processing of controlling the door control section to close all of the door members provided in the receiving section group simultaneously, and simultaneous opening processing of controlling the door control section to open all of the door members provided in the receiving section group simultaneously, the central control device continuously executes the simultaneous closing processing in a period up to completion of the sorting processing with respect to all of the receiving sections that belong to the receiving section group, the central control device executes the simultaneous opening processing after completion of the sorting processing with respect to all of the receiving sections that belong to the receiving section group, and the central control device executes the container replacement processing after completion of the simultaneous opening processing.

According to this configuration, it is possible to appropriately execute the sorting processing while storing articles in all of the receiving sections that belong to a receiving section group, and after the sorting processing is complete, the container replacement processing can be appropriately performed in units of container groups in the state where a group of sorted articles are stored in containers.

It is preferable that the central control device executes the sorting processing and the container replacement processing in parallel.

According to this configuration, the period during which the sorting processing is being executed and the period during which the container replacement processing is being executed can be overlapped with each other, and thus the sorting processing can be performed more efficiently than in the case where the sorting processing is interrupted during the container replacement processing.

It is preferable that there are a plurality of receiving section groups, and the transport device includes:

a plurality of receiving/transporting sections provided in correspondence with the plurality of receiving section groups, the receiving/transporting sections each being configured to store an article group made up of articles received by the corresponding receiving section group in a container group and transport the container group, an upstream transport section connected to upstream end portions, with respect to a transport direction, of the receiving/transporting sections and configured to transport the container group made up of the empty containers to each of the receiving/transporting sections, and a downstream transport section connected to downstream end portions, with respect to the transport direction, of the receiving/transporting sections and configured to receive the container group made up of the filled containers from each of the receiving/transporting sections and to transport the received container groups.

According to this configuration, the container transport route branches from the upstream transport section to a plurality of receiving/transporting sections, and then the branches merge from the receiving/transporting sections into one route at the downstream transport section, and thus the transport capacities of the upstream transport section and the downstream transport section are likely to be lower than the total transport capacity of the receiving/transporting sections. In such a case, the container replacement processing tends to take a relatively long time. However, according to the above configuration, as described above, the period during which the sorting processing is being executed and the period during which the container replacement processing is being executed can be overlapped with each other, and thus even if the container replacement processing takes a long time, it is possible to avoid a decrease in the efficiency of the sorting processing.

INDUSTRIAL APPLICABILITY

The technology according to the present disclosure is applicable to an article transport facility that sorts and transports articles and includes an article transport vehicle for transporting articles, a traveling surface on which the article transport vehicle travels, and a plurality of receiving sections for receiving articles from the article transport vehicle.

The invention claimed is:

1. An article transport facility that sorts and transports articles, comprising:

an article transport vehicle configured to transport the articles;

a traveling surface on which the article transport vehicle is travelable; and a plurality of receiving sections configured to receive the articles from the article transport vehicle, wherein the receiving sections each include an opening, and are further configured to guide the articles through the openings to a position below the traveling surface, wherein the article transport facility further comprises:

a transport device disposed below the traveling surface and configured to transport the articles below the traveling surface;

a plurality of door member provided in correspondence with the plurality of openings and configured to change in orientation between an open orientation in which the openings are open and a closed orientation in which the opening are closed;

a door control section configured to control the door members; and a central control device configured to control the article transport vehicle, the transport device, and the door control section, wherein the transport device is further configured to transport a plurality of the articles synchronously and simultaneously in an article group made up of a plurality of articles guided downward from a receiving section group made up of a plurality of receiving sections among the receiving sections, wherein the door control section opens and closes all of the door members provided in the receiving section group synchronously and simultaneously, and wherein the transport device is further configured to transport a plurality of the containers synchronously and simultaneously in a container group made up of a plurality of containers in which the articles received by the receiving sections are storable, wherein the central control device is configured to execute:

sorting processing of controlling the article transport vehicle to sort an article designated based on specified sorting information to a receiving section designated based on the sorting information, container replacement processing of controlling the transport device to replace a container group made up of a plurality of filled containers each storing at least one article with a container group made up of a plurality of empty containers each not storing an article, simultaneous closing processing of controlling the door control section to close all of the door members provided in the receiving section group simultaneously, and simultaneous opening processing of controlling the door control section to open all of the door members provided in the receiving section group simultaneously, wherein the central control device continuously executes the simultaneous closing processing in a period up to completion of the sorting processing with respect to all of the receiving sections that belong to the receiving section group, wherein the central control device executes the simultaneous opening processing after completion of the sorting processing with respect to all of the receiving sections that belong to the receiving section group, and wherein the central control device executes the container replacement processing after completion of the simultaneous opening processing.

2. The article transport facility according to claim 1, wherein the central control device executes the sorting processing and the container replacement processing in parallel.

3. The article transport facility according to claim 1, wherein there are a plurality of receiving section groups, and wherein the transport device comprises:

a plurality of receiving/transporting sections provided in correspondence with the plurality of receiving section groups, the receiving/transporting sections each configured to store an article group made up of articles received by the corresponding receiving section group in a container group and transport the container group, an upstream transport section connected to upstream end portions, with respect to a transport direction, of the receiving/transporting sections and configured to transport the container group made up of the empty containers to each of the receiving/transporting sections, and a downstream transport section connected to downstream end portions, with respect to the transport direction, of the receiving/transporting sections and configured to transport the container group made up of the filled containers to each of the receiving/transporting sections.

4. An article transport facility that sorts and transports articles, comprising:

an article transport vehicle configured to transport the articles;

a traveling surface on which the article transport vehicle is travelable; and a plurality of receiving sections configured to receive the articles from the article transport vehicle, wherein the article transport vehicle is configured to transfer an article to the receiving section located outward of the article transport vehicle in the width direction, which is a direction orthogonal to a traveling direction of the article transport vehicle in a plan view, wherein the receiving sections each include an opening located outward of the traveling surface in the width direction, and are further configured to guide the articles through the openings to a position below the traveling surface, wherein the article transport facility further comprises:

a transport device disposed below the traveling surface and configured to transport the articles below the traveling surface;

a plurality of door members provided in correspondence with the plurality of openings and configured to change in orientation between an open orientation in which the openings are open and a closed orientation in which the opening are closed; and a door control section configured to control the door members, wherein the transport device is further configured to transport a plurality of the articles synchronously and simultaneously in an article group made up of a plurality of articles guided downward from a receiving section group made up of a plurality of receiving sections among the receiving sections, and wherein the door control section opens and closes all of the door members provided in the receiving section group synchronously and simultaneously.

5. The article transport facility according to claim 4, wherein the article transport vehicle includes a support portion for supporting the article, and a transfer portion for operating the support portion so as to transfer the article, and the transfer portion is configured to tilt the supporting portion so as to transfer the article to the receiving section located outward of the article transport vehicle in the width direction.

6. The article transport facility according to claim 5, wherein the transfer portion is capable of transferring the article to the receiving section that is located on either a first side in the width direction or a second side in the width direction.

* * * * *